April 21, 1970    R. FURTWAENGLER ET AL    3,507,388
APPARATUS FOR SORTING TABLETS
Filed July 15, 1968    5 Sheets-Sheet 1
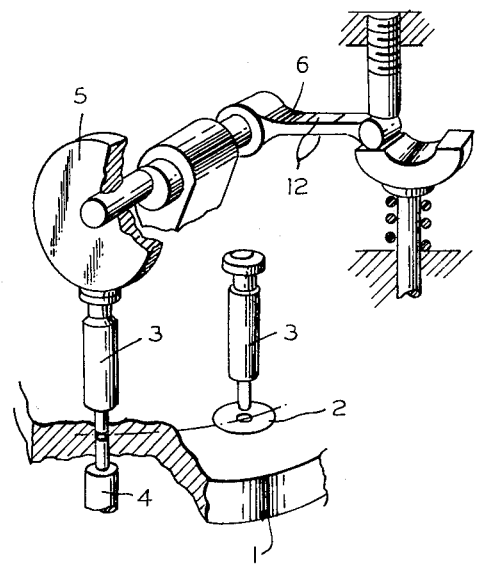
FIG.1
FIG.2
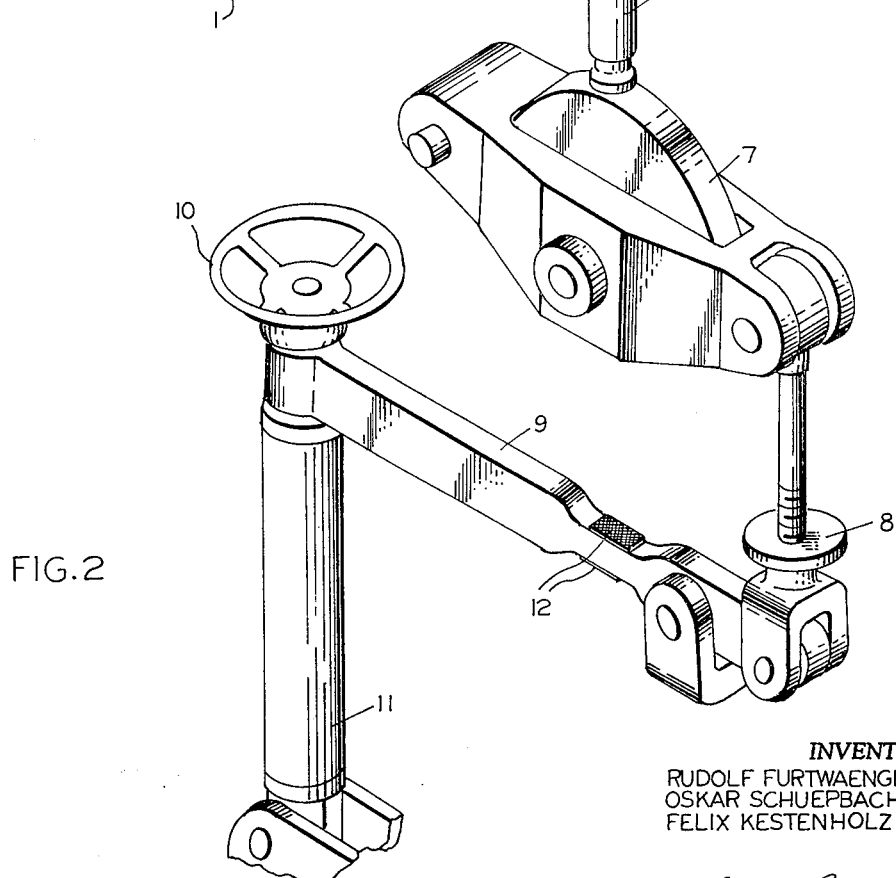
INVENTORS
RUDOLF FURTWAENGLER
OSKAR SCHUEPBACH
FELIX KESTENHOLZ
BY *Wenderoth, Lind & Ponack*
ATTORNEYS 2,507,388
Patented Apr. 21, 1970

1

3,507,388
APPARATUS FOR SORTING TABLETS
Rudolf Furtwaengler, Rheinfelden, Oscar Schuepbach, Birsfelden, and Felix Kestenholz, Liestal, Switzerland, assignors to Ciba Limited, Basel, Switzerland, a company of Switzerland
Filed July 15, 1968, Ser. No. 744,793
Claims priority, application Switzerland, July 21, 1967, 10,421/67
Int. Cl. B07c 1/00
U.S. Cl. 209—79
10 Claims

ABSTRACT OF THE DISCLOSURE

In order to monitor the weight of tablets formed between pairs of punches in a multi-station tablet-making machine, the pressure between the punches is measured by means of a strain-gauge mounted at a part of the machine subject to a stress dependent on the punch pressure. The strain-gauge is electrically connected to develop electrical pulses having a pressure-dependent amplitude, and pulses having amplitudes outside prescribed limits are used to reject the tablets giving rise to such pulses. A succession of out-of-limits pulses causes the machine to be stopped.

---

This invention relates to the making of tablets and is concerned with the provision in a tablet-making machine of means for monitoring the weight of the tablets and for separating tablets having weights outside prescribed limits from those tablets having weights within these limits.

In supervising the production of tablets in a tablet-making machine, continuous measurement of the pressure relationships in a tablet-press enables the formation of each individual tablet to be supervised, even when producing large quantities with high-speed presses. It is possible to tell when the tablets being produced depart from a set standard (weight, hardness, coherence). In spite of many advantages, this form of supervision has not hitherto become widespread in tablet production. This would appear to be because in a first group of hitherto known processes and arrangements, the pressure relationships are recorded over several revolutions of the press, and only from the overall picture of these diagrams are conclusions drawn regarding granulate quality, press operation etc. This method is certainly suitable for scientific investigations, but not for the direct supervision of production. In a second group of appliances for supervising tablet-weight, an error signal generated in a measuring bridge is used to affect the formation of tablets by altering the punch-pressure or stroke-height and/or the feed of substance to be pressed. This method, which requires relatively heavy expenditure on apparatus, offers no security against the production of non-standard tablets, which in consequence are scarcely capable of subsequent selection, or only at considerable additional expense.

The present invention has developed in relation to the problem of monitoring the weight of tablets in a multi-station press and particularly a press of the rotary kind. The monitoring is effected by way of means responsive to the pressure exerted between a pair of opposed punches compressing the tablet material at a tablet station as it moves past a tablet-forming point in the press. Normally each tablet-station has an associated pair of punches that move therewith but the same monitoring can be applied to a pair of coaching punches permanently mounted at the tablet-forming point to coact with each station as it moves past.

Accordingly, in a tablet-making machine having a plurality of tablet stations at each of which a tablet is made by compressing material between a pair of opposed

2 punches, and means for moving the tablet stations successively past a point at which force is applied to said punches to form a tablet, the formed tablets moving along a predetermined path, there is provided apparatus comprising strain gauge means mounted on a part of the machine subject to a stress dependent on the pressure exerted between the punches forming a tablet at said point; means connected to said strain gauge means to develop an electrical pulse for each tablet formed at said point, said pulse having an amplitude dependent on the pressure exerted between the punches forming the tablet; a pulse-amplitude discriminator responsive to said pressure-dependent pulses to produce an output signal when the amplitude of a pulse fails to fall between pre-selected upper and lower limits, shift register means for receiving said output signal; means for causing said output signal to be shifted through said shift register means in synchronism with the movement of said tablet stations after said tablet-forming point; and means located in the path of the formed tablets at a point corresponding to the delay in shifting a signal from said pulse-amplitude discriminator through said shift register means and operable by the arrival of an output pulse from said discriminator at an output stage of said shift register to selectively guide the tablet which gave rise to said output pulse and separate this tablet from the tablets which do not cause output pulses to be produced by said pulse-amplitude discriminator.

The apparatus defined in the foregoing paragraph may be fitted as an extra to almost all currently used tablet-presses, and ensures that faulty tablets are immediately segregated during production.

In a preferred embodiment of the invention, in the apparatus above defined said pulse-amplitude discriminator is adapted to provide a first output pulse for a tablet giving rise to a pulse the amplitude of which exceeds said upper amplitude limit and a second output pulse for a tablet which gives rise to a pulse the amplitude of which fails to exceed said lower amplitude limit, and in which said shift register means comprises first and second shift registers responsive to said first and second output pulses respectively from said discriminator, said tablet-guidance means being operable by a first or second output pulse of said discriminator reaching an output stage of said first or second shift registers. The apparatus further comprises first and second AND circuits having their inputs coupled to a plurality of successive stages in said first and second shift registers respectively so as to provide an output signal from said first or said second AND circuit when said plurality of stages in said first or said second shift register each contains a first discriminator output signal or a second discriminator output signal respectively; and means controlling the movement of said tablet stations operable by an output signal from said first or second AND circuit to stop the movement of said tablet stations.

In order that the invention and the manner of carrying it into effect may be better understood, an embodiment of the invention, as applied to an existing form of tablet press, will now be described by way of example with reference to the accompanying drawings in which:

FIGURES 1 and 2 show a diagrammatic perspective illustration of those parts of a known tablet-making machine which participate directly in the pressing operation: only those parts relevant to an understanding of the present invention are shown;

Figure 3:
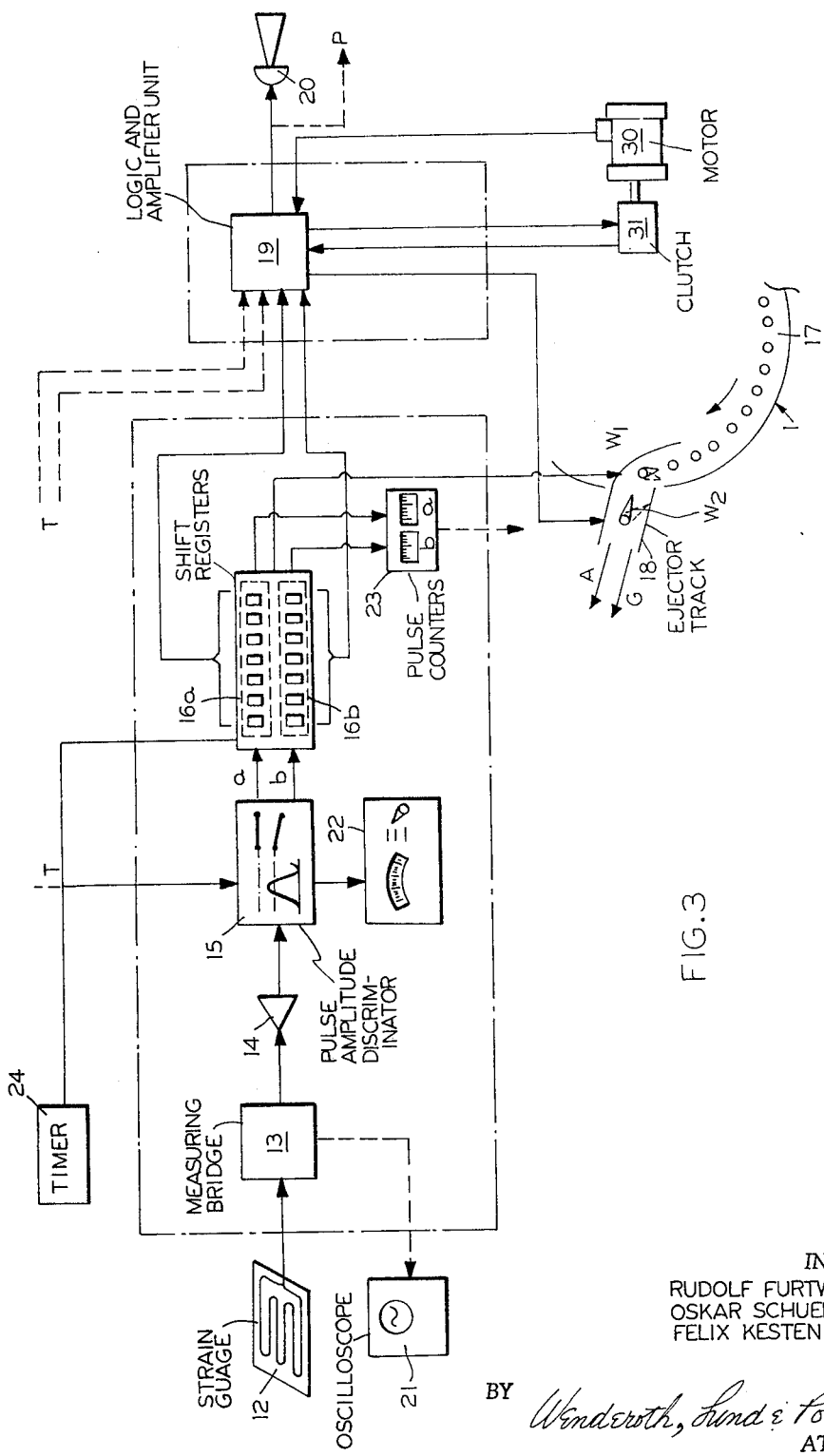
FIGURE 3 shows a block diagram of the apparatus for monitoring tablet weights.

Of the portion of the tablet-making machine shown, FIGURE 1 shows the die-carrier 1 which is in the form of a disc rotatable about its axis and containing dies such as 2 and which rotates together with pairs of punches associated and cooperable with the dies 2. Each pair of punches comprises an upper punch 3 and a lower punch 4. In FIGURE 1 two upper punches 3 and one lower punch 4 are shown. An upper pressure-roller 5 is provided for actuating the upper punches, and the suspension for this pressure-roller includes a lever-arm 6. FIGURE 2 shows the means for displacing the lower punches including a pressure-roller 7 mounted in a housing, a pressure-setting wheel 8, for adjusting the roller 7 through the housing, and a spring-housing 11. Strain-gauges 12 are fastened to the levers 6 and 9 in order to measure the punch-pressure although only one lever need be so equipped. These levers are subject to bending stresses dependent on the pressure exerted between the punches. The remaining parts of the tablet-making machine are of no significance to the present invention, and it is believed that no further description of this portion of the machine is needed.

The block circuit diagram in FIGURE 3 shows diagrammatically part of the die-carrier 1 of the tablet-making machine having a plurality of tablet stations around its periphery. Also in FIGURE 3 is shown the strain-gauge 12 fastened to one of the levers 6 and 9 and described with reference to FIGURES 1 and 2; furthermore there is shown a drive unit for the machine comprising a motor 30 and a clutch 31 through which drive is applied to the carrier 1 to rotate same and move the tablet stations successively past a tablet-forming point 17 at which pressure is exerted between the pair of punches presently at that point by the force of the pressure rollers abovementioned acting thereon whereby the tablet material fed to the die 2 is compressed.

In FIGURE 3, the strain-gauge 12 is of the variable resistance kind and is connected as one arm of a measuring bridge 13 the output (diagonal of the bridge) of which is connected via an amplifier 14 to the input of a pulse-amplitude discriminator 15. This pulse-amplitude discriminator operates with upper and lower amplitude limits. It has two outputs $a$ and $b$, and is so designed that a signal is always delivered at the first output $a$ when the peak of a pulse fed to its input exceeds the upper limit, and that a signal is always delivered at the second output $b$ when the input pulse fails to exceed the lower amplitude limit. The two limiting values are presettable as desired. No output is produced when the pulse falls within the prescribed limits. The two outputs $a$ and $b$ of the pulse-amplitude discriminator 15 are connected to shift-registers 16a and 16b respectively. The number of effective stages in each of the two shift-registers (which number is preferably adjustable) is so chosen as to agree with the number of tablet-locations (on the carrier 1) disposed between the pressing point 17 and the entrance to an ejector track 18 at which the formed tablets carried around the periphery of the disc 1 leave the disc. In FIGURE 3, seven such locations are shown. At the entrance to track 18, there is a switch-point with a deflector means $W_1$ controlled from the shift-registers in such a manner as always to be turned into a reject position (chain lines) when a signal appears in the last stage of either of the two shift-registers 16a and 16b so as to selectively guide faulty tablets along a path indicated by arrow A, and separate these tablets from good tablets which continue when the deflector means $W_1$ is in its full-line position along a path indicated by arrow G. The output stages of shift-registers 16a and 16b are connected to pulse-counters 23a and $b$ respectively. An oscilloscope 21 is connected to the output diagonal of the measuring bridge 13. The shifting of pulses through the shift registers is synchronized with the movement of the tablet stations after the tablet-forming point by means described hereinafter.

Figure 4:
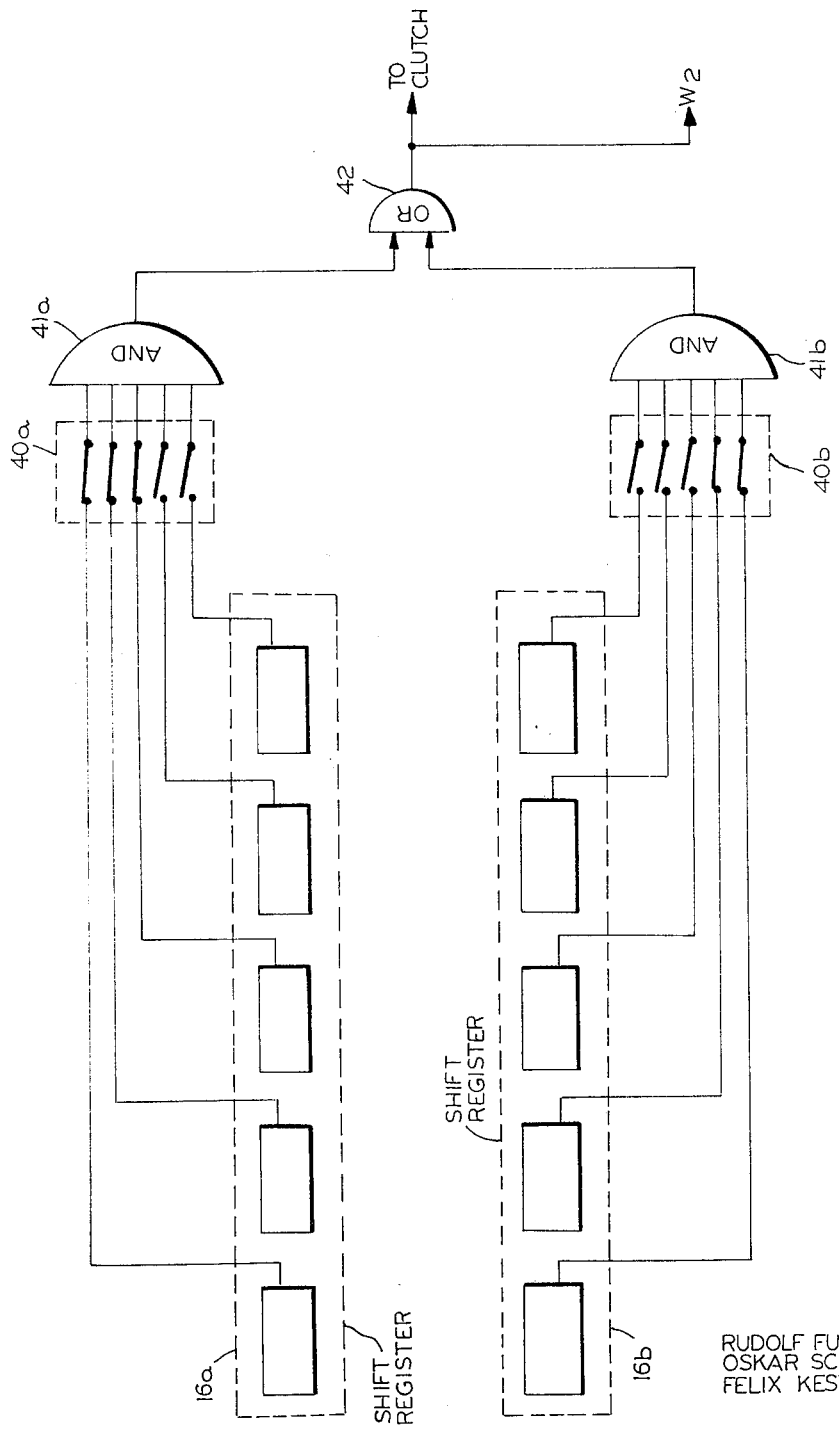
FIGURE 4 shows in more detailed form, circuitry relating to the shift registers shown in FIGURE 3.

In FIGURE 4, a preselected number of immediately successive stages in each of the two shift-registers 16a and 16b are connected to the inputs of AND circuits 41a and 41b respectively by means of preselector switching arrangements 40a and 40b respectively settable at choice. The outputs of the AND circuits 41a and 41b control a deflection means $W_2$ at a second switch-point arranged in the ejector track after the deflector means $W_1$, and also control clutch 31 of the drive motor 30 through an OR gate 42 in such a manner that, whenever the preselected stages are set (i.e. each contains an output pulse from discriminator 15) in one of the two shift-registers 16a or 16b, the drive to the carrier 1 is switched off via the clutch 31, and the deflector means $W_2$ at the second switch-point is displaced to the reject side shown in chain lines. The deflector means $W_2$ is normally in the position shown in full-line to allow passage of the previously separated good and faulty tablets along their respective paths G and A. The preselectors 40a and 40b, the AND circuits 41a and 41b and the OR gate 42 form part of a single logic and amplifier unit denoted by numeral 19 in FIGURE 3. As indicated in FIGURE 3, the arrangement may furthermore be so designed that a warning signal is generated in the logic and amplifier unit 19 at the same time as the drive to the die-carrier 1 is switched off and the deflector means $W_2$ at the second switch-point is displaced to the reject side. The warning signal, for example, trips a horn 20 and/or is transmitted via a lead P shown in dashed line to a central production-supervising station.

The control of the deflector means $W_2$ at the second switch-point is associated with the control of the clutch 31 and/or of a switch governing the driving motor 30 in such a manner that when the clutch is disengaged and/or the motor is switched off the said switch-point is pivoted into the reject position, and when the clutch is engaged and the motor switched on the said switch-point is pivoted into the good (full-line) position after a delay dependent on time or machine timing. The time-delay is preferably variable at will.

Figure 5:
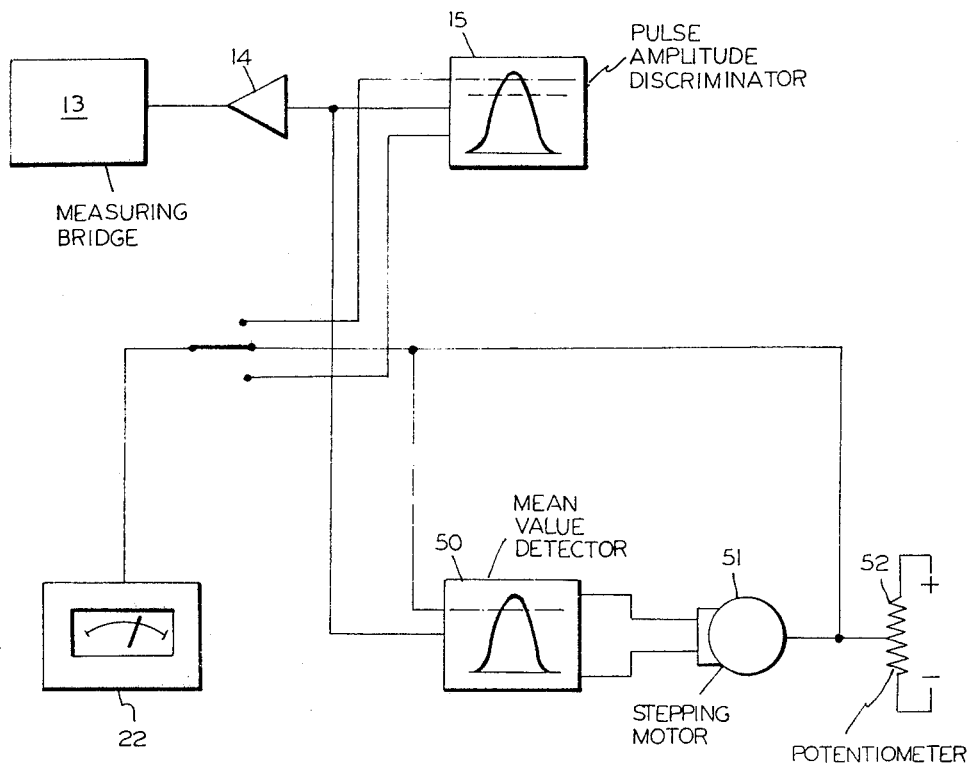
FIGURE 5 shows circuitry in block form for monitoring average tablet weight.

It is preferred to provide means for obtaining the mean value (statistical average value) of the pulse amplitudes from the bridge 13. Such means is shown in FIGURE 5 and comprises a mean-value detector connected to the input of the pulse-amplitude discriminator 15 of FIGURE 3. This mean-value detector 50 provides a variable gating or comparison level through a stepping motor 51 and potentiometer 52. The motor is controlled by the comparison of the pulse amplitudes with the gating level. In the circuit of FIGURE 5, each pulse which goes above the gating level alters the level upwards by a predetermined amount by actuating the stepping motor 51 which controls the slider of potentiometer 52 from which the gating level is obtained. Each step may be, for example, about one part in a thousand of the whole potentiometer range. Each pulse which does not reach the gating level alters the latter downwards by the same amount. The stepping motor therefore sets the gating level to the mean value, i.e. to that value which on the average is exceeded and not reached the same number of times.

Figure 6:
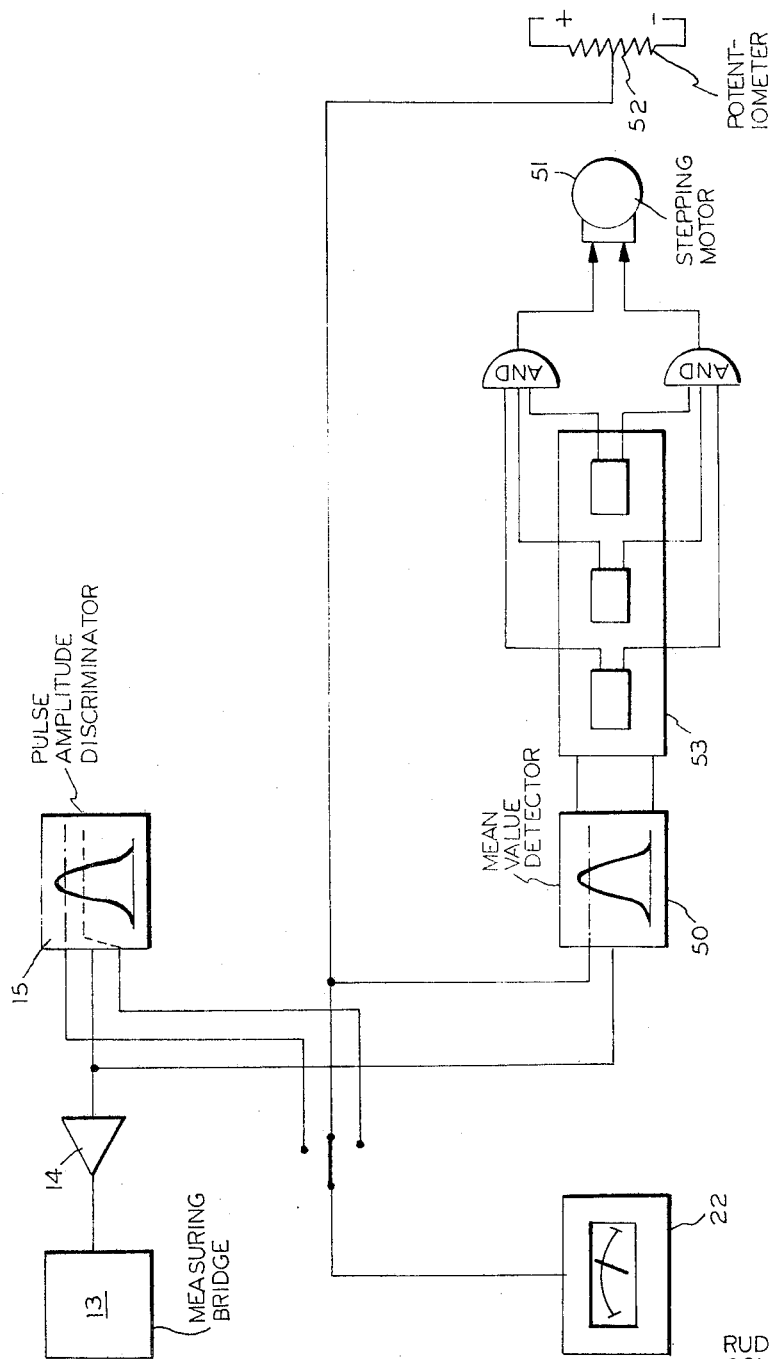
FIGURE 6 shows a modification of the circuitry of FIGURE 5.

In order to reduce wear on the stepping motor and potentiometer, the circuit of FIGURE 5 may be modified as shown in FIGURE 6. Here the circuit is so designed that the last-arrived pulse is not used to control the stepping motor, but the amounts above and below the gating level are first of all stored in a shift-register 53 comprising for example three stages. The shift register stages are coupled as inputs to an AND-gate 54 which provides an output when all the stages are in the reset condition following three successive pulses above the gating level, say, and as inputs to an AND-gate 55 which provides an output following three successive pulses below the gating level. The stepping motor 51 is controlled by the outputs of the AND-gates 54 and 55 to change the gating level upwards or downwards respectively via potentiometer 52 when an output is provided from one or the other; if mixed information is present in the shift register so that not all stages are in the same state, the stepping motor is at a standstill. The stepping motor thus displays "backlash," with the result that it and the potentiometer undergo considerably less wear.

The pulse amplitude discriminator 15 is equipped with one output terminal at which is present the upper amplitude limit set in the discriminator and another output terminal at which is present the lower amplitude limit. The mean-value detector 50 has an output terminal at which the mean value appears. These three terminals are connectable to an indicating instrument 22 through a switch 56 as is shown in both FIGURES 5 and 6.

The synchronizing of the monitoring apparatus with the tablet-machine operation has already been mentioned. For this purpose a timing device 24 is provided linked to the machine so that correct operation independent of machine speed is obtained. The timing device provides control pulses on various leads marked T, including one such lead through which pulses are applied to the shift registers 16a and 16b to cause shifting of the information therein.

In referring to FIGURES 1 and 2 it was described how the strain-gauge 12 is arranged on a part of the upper-punch control means (lever 6, FIGURE 1) or of the lower-punch displacement device (lever 9, FIGURE 2) which is stressed in bending. Preferably, the lever at which the stress is to be measured is provided with two strain-gauge elements, one being arranged in the tension zone and the other in the compression zone of the lever. These two strain-gauge elements are connected into adjoining arms of the measuring bridge 13. This provides thermal compensation without anything further having to be done.

The operation of the apparatus above-described will now be described.

That mechanical part (lever 6 or 9) of the tablet-press which is suited to taking up thrust from the upper or lower punch is stressed in bending (compression or tension) during the pressing operation. As a result, this part undergoes a slight alteration in length which causes a corresponding alteration in the resistance of the strain-gauge 12. The measuring bridge 13 delivers a voltage signal in the form of a pulse having an amplitude proportional to this alteration in resistance. The pulse voltage is thus a measure of the compression stress on the corresponding punch and the pressure between the punches 3 and 4.

The voltage signal generated upon each pressing operation is fed via the amplifier 14 to the pulse-amplitude discriminator 15, which compares the relevant maximum value with an upper and a lower reference voltage (the amplitude limits previously referred to) capable of being preset. If the maximum voltage falls outside the tolerance range defined by the preset limits a corresponding "bad" signal is passed on to the shift-register 16a and 16b, where it is stored by means of digital-type stages.

After the corresponding tablet has been pushed out of the die 2, which according to the type of machine occurs only after a few more pressing operations, for example six to seven, the "bad" signal which has meanwhile been shifted into the last store causes a corresponding movement to be imparted to the deflector means $W_1$ at the first switch-point which deflects the out-of-tolerance tablet into the reject chanel (arrow A). The number of singly rejected tablets is separately recorded as "too heavy" and "too light" by means of the two pulse-counters 23a and b.

Should basic trouble in the tablet-making machine lead to the occurrence of a plurality of out-of-tolerance tablets in immediate sequence—the permissible number can be preselected as shown in FIGURE 4—a stop signal passes from the shift-register directly to the logic and amplifier unit 19, which brings the tablet-making machine to a standstill immediately via the clutch 31. At the same time, the deflector means $W_2$ at the second switch-point is switched to "reject," so that the tablets still being pressed while the tablet-machine is running down are deflected from the normal path G and along path A.

The signalling system (horn, lamp) 20 draws attention to the stationary machine. The shift-registers 16a, 16b are each provided with an indicator lamp to immediately reveal whether the last tablets pressed immediately before the stop signal was established were above or below the tolerance limit, so that the cause of trouble can be rapidly found out, and corresponding measures taken.

If the machine is set in operation again, the deflector means $W_2$ at the second switch-point remains briefly (delay) at "reject." This ensures that the "bad" tablets still present in the dies as a result of the preceding trouble are segregated.

It it is required to connect a plurality of tablet-making machines to a central production-supervision system, the corresponding items of information (ejected single tablets, stationary machine times) may be taken directly from the supervisory appliance via the lead P.

A cathode-ray oscilloscope or a suitable loop oscilloscope 21 may be connected to the measuring bridge 13 for the purpose of checking the measuring device and the variation in compression on the individual punches, and investigating granulates or lubricants etc. Previous calibration of the system can enable the effective pressure to be readily determined from the recorded voltage values.

The system is set to a specific tablet production in the following manner: After the tablet-making machine has been adapted to the specific product, the press is regulated to the desired average specified weight as a result of weighing all the tablets of a complete revolution.

If the product being dealt with is one whereof the regression between tablet-weight and maximum voltage is known from earlier experimental definitions, the pressure on the machine is so regulated that the indicator instrument 22 indicates the desired mean value. The required limiting values, which are likewise indicated on the indicator instrument 22, are then set by means of setting knobs on the pulse amplitude discriminator 15, and the system is ready to operate. The correctness of the set limiting values may be simply checked at any time by brief weight-adjustments on the tablet-making machine and weighing the individual ejected tablets at the first switch-point ($W_1$).

If the product being dealt with is a new one whereof the relationship between maximum voltage and tablet-weight is not yet known, the following procedure is adopted: Adapting the tablet-making machine and setting the specified weight by weighing every tablet of a full revolution. Setting the pressure on the tablet-making machine to the desired tablet-hardness. Starting from the mean value indicated on the measuring instrument 22, the upper and lower limiting values are moved close together, and displaced downwards or upwards in steps and in parallel with a corresponding weight-adjustment. Simultaneously taking the tablets sorted out as "good" at the first switch-point ($W_1$) and weighing them enables the relationship between pressure or maximum voltage and tablet-weight to be rapidly recorded in the region of interest, and the limiting values corresponding to the permissible weight-tolerances to be rapidly determined.

We claim:

1. In a tablet-making machine having a plurality of tablet stations at each of which a tablet is made by compressing material between a pair of opposed punches, and means for moving the tablet stations successively past a point at which force is applied to said punches to form a tablet, the formed tablets moving along a predetermined path, apparatus comprising strain gauge means mounted on a part of the machine subject to a stress dependent on the pressure exerted between the punches forming a tablet at said point; means connected to said strain gauge means to develop an electrical pulse for each tablet formed at said point, said pulse having an amplitude dependent on the pressure exerted between the punches forming the tablet; a pulse-amplitude discriminator responsive to said pressure-dependent pulses to produce an output signal when the amplitude of a pulse fails to fall between preselected upper and lower limits, shift register means for receiving said output signal; means for causing said output signal to be shifted through said shift register means in synchronism with the movement of said tablet stations after said tablet-forming point; and means located in the path of the formed tablets at a point corresponding to the delay in shifting a signal from said pulse-amplitude discriminator through said shift register means and operable by the arrival of an output pulse from said discriminator at an output stage of said shift register to selectively guide the tablet which gave rise to said output pulse and separate this tablet from the tablets which do not cause output pulses to be produced by said pulse-amplitude discriminator.

2. The apparatus as defined in claim 1, in which said pulse amplitude discriminator is adapted to provide a first output pulse for a tablet giving rise to a pulse the amplitude of which exceeds said upper amplitude limit and a second output pulse for a tablet which gives rise to a pulse the amplitude of which fails to exceed said lower amplitude limit, and in which said shift register means comprises first and second shift registers responsive to said first and second output pulses respectively from said discriminator, said tablet guidance means being operable by a first or second pulse of said discriminator reaching an output stage of said first or second shift registers.

3. The apparatus as defined in claim 2, further comprising first and second AND circuits having their inputs coupled to a plurality of successive stages in said first and second shift registers respectively so as to provide an output signal from said first or said second AND circuit when said plurality of stages in said first or said second shift register each contains a first discriminator output signal or a second discriminator output signal respectively; and means controlling the movement of said tablet stations operable by an output signal from said first or second AND circuit to stop the movement of said tablet stations.

4. The apparatus as defined in claim 3, comprising a further tablet guidance means located after the first-mentioned tablet guidance means and operable in response to an output signal from said first or second shift register to guide all tablets away from the path normally followed by those tablets which do not cause output pulses to be produced by said pulse-amplitude discriminator.

5. The apparatus as defined in claim 4, in which said second guidance means has a delayed action, upon movement of said tablet stations being resumed, in returning to a state allowing those tablets which do not cause output pulses to be produced by said pulse-amplitude discriminator to follow their normal path.

6. The apparatus as defined in claim 2, comprising first and second pulse counters coupled to said pulse-amplitude discriminator to count the numbers of said first and second output pulses respectively therefrom.

7. The apparatus as defined in claim 1, in which said strain gauge means and said means connected thereto to develop said pressure-dependent pulses form a bridge circuit, said strain gauge means having a strain-dependent resistance whereby said pressure-dependent pulses are developed across a diagonal of said bridge circuit.

8. The apparatus as defined in claim 7, in which said strain gauge means comprises a pair of strain-gauge elements, and said elements are mounted on a part of said tablet-machine subject to a bending stress, one of said elements being mounted at a compression zone of said part and the other of said elements being mounted at a tension zone of said part, and said elements defining adjoining arms of said bridge circuit.

9. The apparatus as defined in claim 1, comprising a detector responsive to said pressure-dependent pulses to derive a signal representing the mean amplitude thereof.

10. The apparatus as defined in claim 9, in which said pulse-amplitude discriminator has outputs at which appear signals representing said upper and lower amplitude limits, and in which said detector has an output at which appears a signal representing said mean pulse amplitude, and further comprising an indicating instrument and switching means coupling said indicating instrument to said signal outputs to selectively display said amplitude-representing signals on said indicating instrument.

References Cited

UNITED STATES PATENTS

| | | | |
|---|---|---|---|
| 2,839,252 | 6/1958 | Hall | 107—17 X |
| 2,975,630 | 3/1961 | Michel | 73—94 X |
| 2,992,729 | 7/1961 | Curtius | 209—79 |

RICHARD A. SCHACHER, Primary Examiner

U.S. Cl. X.R.

73—88.5; 107—17